US008918419B2

(12) United States Patent
Zaidi

(10) Patent No.: US 8,918,419 B2
(45) Date of Patent: Dec. 23, 2014

(54) OBJECT COMPARISON VIA REAL TIME METADATA CALCULATION

(75) Inventor: Huma Zaidi, Delta (CA)

(73) Assignee: SAP SE, Walldorf (DE)

( * ) Notice: Subject to any disclaimer, the term of this patent is extended or adjusted under 35 U.S.C. 154(b) by 362 days.

(21) Appl. No.: 12/978,963

(22) Filed: Dec. 27, 2010

(65) Prior Publication Data

US 2012/0166476 A1    Jun. 28, 2012

(51) Int. Cl.
*G06F 17/30* (2006.01)
(52) U.S. Cl.
CPC .............. *G06F 17/30997* (2013.01)
USPC .................. 707/769; 707/E17.014
(58) Field of Classification Search
CPC .......... G06F 17/30979; G06F 3/04815; G06F 17/30241; G06F 17/30265; G06F 17/3028
USPC .......................... 709/220, 223, 226
See application file for complete search history.

(56) References Cited

U.S. PATENT DOCUMENTS

| 8,027,954 B2* | 9/2011 | Malcolm ............... 707/621 |
| 8,166,026 B1* | 4/2012 | Sadler ................. 707/725 |
| 8,489,603 B1* | 7/2013 | Weissgerber et al. ...... 707/737 |
| 2008/0077609 A1* | 3/2008 | Ronen ................. 707/102 |
| 2010/0153444 A1* | 6/2010 | Nayak et al. ........... 707/770 |

* cited by examiner

*Primary Examiner* — Anteneh Girma
(74) *Attorney, Agent, or Firm* — Kenyon & Kenyon LLP

(57) ABSTRACT

A system and method for real-time comparison of data objects stored in a repository. A comparison of a plurality of selected objects may be implemented. A metadata comparison summary may be displayed to the user. The comparison summary may identity the most viewed, most liked, most disliked, or also viewed objects. The metadata comparison may be displayed on a user interface via the addition of an identification icon, by color highlighting a list of objects in the repository, by displaying a comparison summary in an information panel, or by other methods of object identification. In an embodiment, the user may control the type of information displayed in the comparison summary.

24 Claims, 3 Drawing Sheets

100

200

300

400

OBJECT COMPARISON VIA REAL TIME METADATA CALCULATION

BACKGROUND

Aspects of the present invention relate generally to the field of information systems and computer software and more specifically to providing meta data information for objects in real time.

An object is a software model representing a real-world component. For example, an object may represent a document such as a file, a report, an invoice, a book, photographs or a spreadsheet. An object may also represent other more complex components, for example a product, a person, a business partner, a customer, or a piece of equipment. Objects may be stored in a repository, limited only by the storage capacity of the repository. If a significant number of objects are stored in a single repository, it may be difficult for users to discover the most useful object in the repository.

In some repositories, meta-data may be provided to facilitate organization of objects in the repository. The metadata may include the name of the object, the date the object was modified or created, the type of the object (i.e. a Microsoft Office document, Crystal Reports document file or a text file), the size of the object, the location of the object, and the author(s) of the object. However, in some repositories, when such metadata is available, a user searching for the most useful object in a repository will have to select each individual object, one at a time, to view the metadata for each object. If metadata is not available, or the metadata fails to provide sufficient information to identify the desired object, the user will have to open each individual object and analyze the contents of each object to identify the most useful object.

However, selecting more than one object at a time will not result in more efficient results. In most repositories, the metadata for multiple selected objects may not be shown or may not be valuable. When multiple objects are selected within a repository, the metadata for a particular value will not be shown if the metadata value for each individual object is unique. For example, if multiple objects are selected, the author metadata for the selected objects will not be shown or may be shown only if the author is identical for all of the selected objects. The metadata for the selected objects may show an aggregation of the metadata values for each of the objects in the group, for example, the total size for all the selected objects or the total number of objects selected. Thus a system that more efficiently displays metadata to facilitate the discovery of the most useful object stored in a repository may be desired.

DETAILED DESCRIPTION

The metadata for a plurality of objects selected from a repository may be compared, in real time, to identify the most useful objects in the repository, in at least one comparison category. The identity of the most useful objects may be conveyed to the user via an identification of the most viewed, most liked, most disliked, or also viewed objects. The metadata comparison may be displayed on a user interface via the addition of an identification icon, by color highlighting a list of objects in the repository, by displaying a comparison summary in an information panel, or by other methods of object identification.

Figure 1:
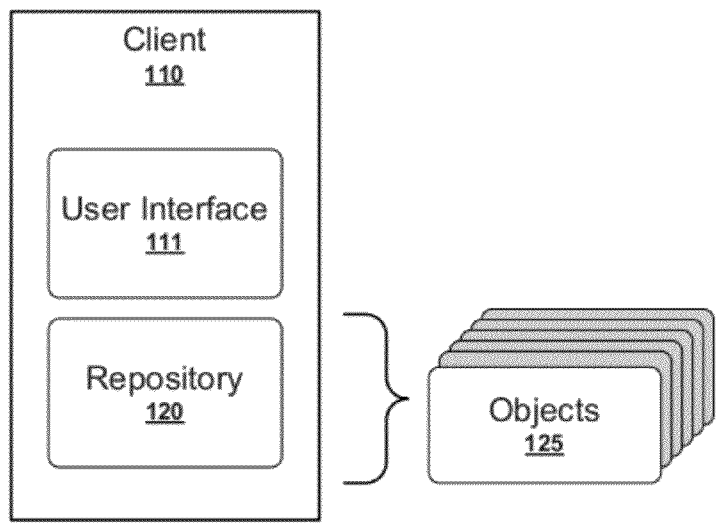
FIG. 1 is a simple block diagram illustrating components of an exemplary system according to an embodiment of the present invention.

A user may access a repository in a standalone client system, client-server environment, or a networked environment. FIG. 1 is a simple block diagram illustrating components of an exemplary system 100 according to an embodiment of the present invention. As shown in FIG. 1, a system 100 may comprise a client 110 having a user interface 111 and a repository 120. A plurality of objects 125 stored in the repository 120 may represent files, reports, books, photographs, products, or other items that may be modeled as an object. The plurality of objects 125 may be stored in the repository 120 in the client's local memory device. The client 110 may be any computing system that facilitates a user accessing a repository 120 of objects, for example a personal computer or mobile handheld computing device. The repository 120 may be any object storage device, for example, a disk drive, a folder, or a database. If t the plurality of objects 125 are stored in a database, the information and metadata for each object may be stored in the record of the object 125. The object and the related metadata may then be retrieved by querying the database.

A user may access the plurality of objects 125 stored in the repository 120 from the client 110 via a user interface 111 capable of accessing the repository 120 and displaying the plurality of objects 125 and the related metadata stored therein. The user interface 111 may be a program or application or may comprise middleware that acts as a frontend to or otherwise facilitates access to the repository 120. The user may interact with the user interface 111 through an input device, such as by inputting a selection as with a mouse or inputting a selection as with a keyboard. The user may observe the response to the selection on an output device or display. In accordance with an aspect of the invention, the user interface 111 may run in a browser window controlled by the user. In another aspect of the invention, the user interface 111 may run in an application window controlled by the user, for example, a Windows Explorer application window or a Macintosh Finder application window.

The plurality of objects 125 may be displayed to the user via an object list in the user interface 111. Then the user may select a subset from the plurality of objects 125 displayed in an object list. This selection may be accomplished in any manner by which a user can select one or more objects from a list or display. For example, the user may select a plurality of objects by selecting each item to be added to the subset, by holding the shift key while selecting multiple objects with a mouse, by holding the control key while selecting multiple objects with a mouse, by clicking on each item with a mouse and adding it to the subset with a popup menu, etc. The subset may contain two or more, or even all of the objects in the object list. A processor or other backend at the client 110, or as part of the repository 120, may perform a comparison of the metadata of the selected objects 125. A comparison summary may be created and displayed to the user via the user interface 111. The comparison summary may include comparison categories that convey information about the selected objects to the user. The user may select the comparison categories to be displayed in the comparison summary. This selection may be made in any manner the user can control a display. For example, with a settings or options menu, by clicking the displayed category heading and selecting a 'hide' option from a popup menu, or by selecting a display or hide option for a category from a drop down list. According to an aspect of the invention, comparison categories may include the most viewed object, the object with the most positive reviews, the object with the most negative reviews, or objects that were also viewed by those users who viewed the selected objects.

Figure 2:
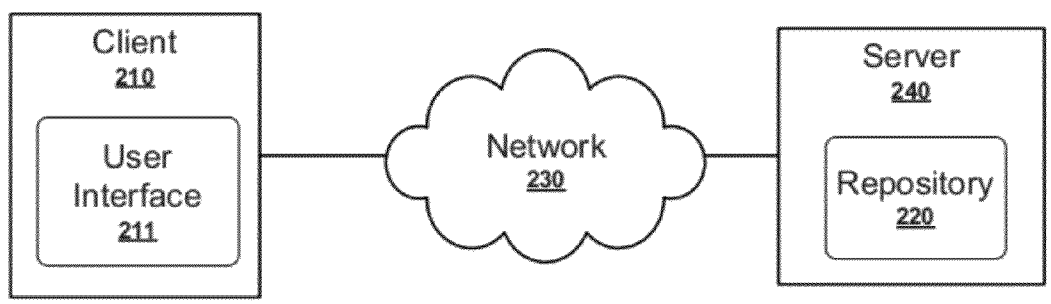
FIG. 2 is a simple block diagram illustrating components of an exemplary system according to an embodiment of the present invention.

FIG. 2 is a simple block diagram illustrating components of an exemplary system 200 according to an embodiment of the present invention. As shown in FIG. 2, system 200 may comprise a client 210 having a user interface 211. The client 210 may be connected to a server 240 via a network 230. A user may access a plurality of objects stored in the server 240 at a repository 220. The user interface 211 may be any interface capable of accessing and displaying objects stored at the repository 220. The network 230 may be a wired or wireless network that may include a local area network (LAN), a wireless area network (WAN), the Internet, or any other network available for accessing the repository 220 via the client 210 with the user interface 211.

The server 240 may be a network server connected to the client 210 via the network 230 that may manage the repository 230. The client 210 may receive from the user a request to select a plurality of objects stored in the repository 220. The repository 220 may respond to the request by comparing the metadata for the selected objects and identifying objects for a comparison summary. The repository 220 may return the comparison summary to the user interface 211 via the server 240. Multiple different clients (not shown) may access the repository 220 and the objects stored therein.

Figure 3:
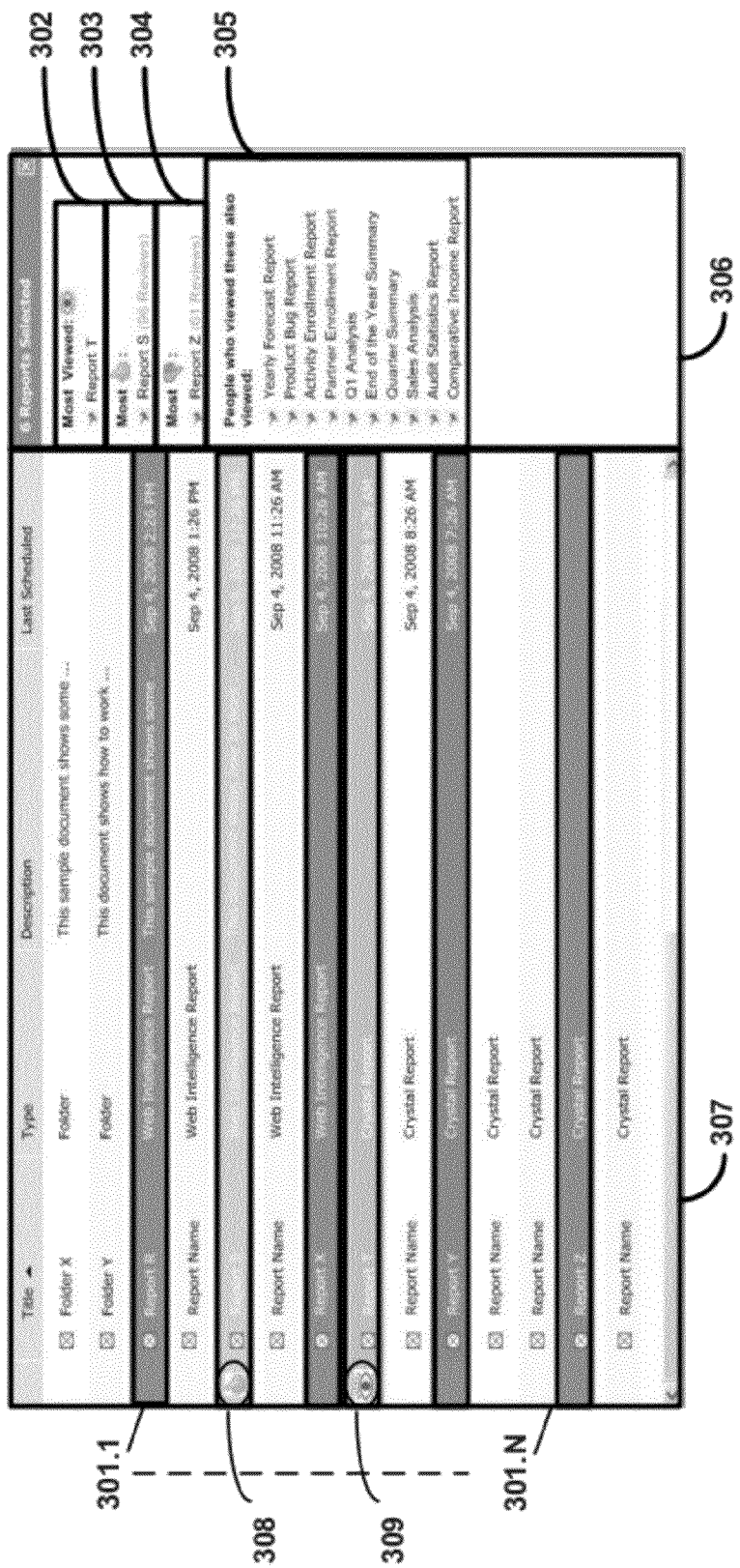
FIG. 3 shows an exemplary user interface according to an embodiment of the present invention.

FIG. 3 shows an exemplary user interface 300 according to an embodiment of the present invention. As shown in FIG. 3, the user interface 300 may include a list of objects that may be displayed in the main panel 307. A user may select, via the user interface 300, a plurality of objects 301.1-301.N. Then, the comparison summary for the selected objects 301.1-301.N may be displayed in summary panel 306. As shown, the comparison summary may identify a plurality of summary categories. The user may hide or show the panel 106. For example, an object from the plurality of selected objects 301.1-301.N that has been viewed the most 302 may be identified in the comparison summary. An object from the plurality of selected objects 301.1-301.N that has the most positive reviews 303 may be identified in the comparison summary. An object from the plurality of selected objects 301.1-301.N that has the most negative reviews 304 may be identified in the comparison summary. Or object(s) that have been viewed by the users that have viewed the plurality of selected objects 305 may be identified in the comparison summary. The listed objects 302, 303, 304, and 305, identified in the comparison summary may be identified in the main panel 307 with icons (i.e. 308 and 309) for the relevant comparison categories or with color highlighting. Icons 308 and 309 representing the relevant comparison categories may be placed next to identified object(s) in the original object list of the main panel 307. For example, a thumbs up may be used as the icon for the highest rated object 308 and a thumbs down for the lowest rated object (not shown).

Figure 4:
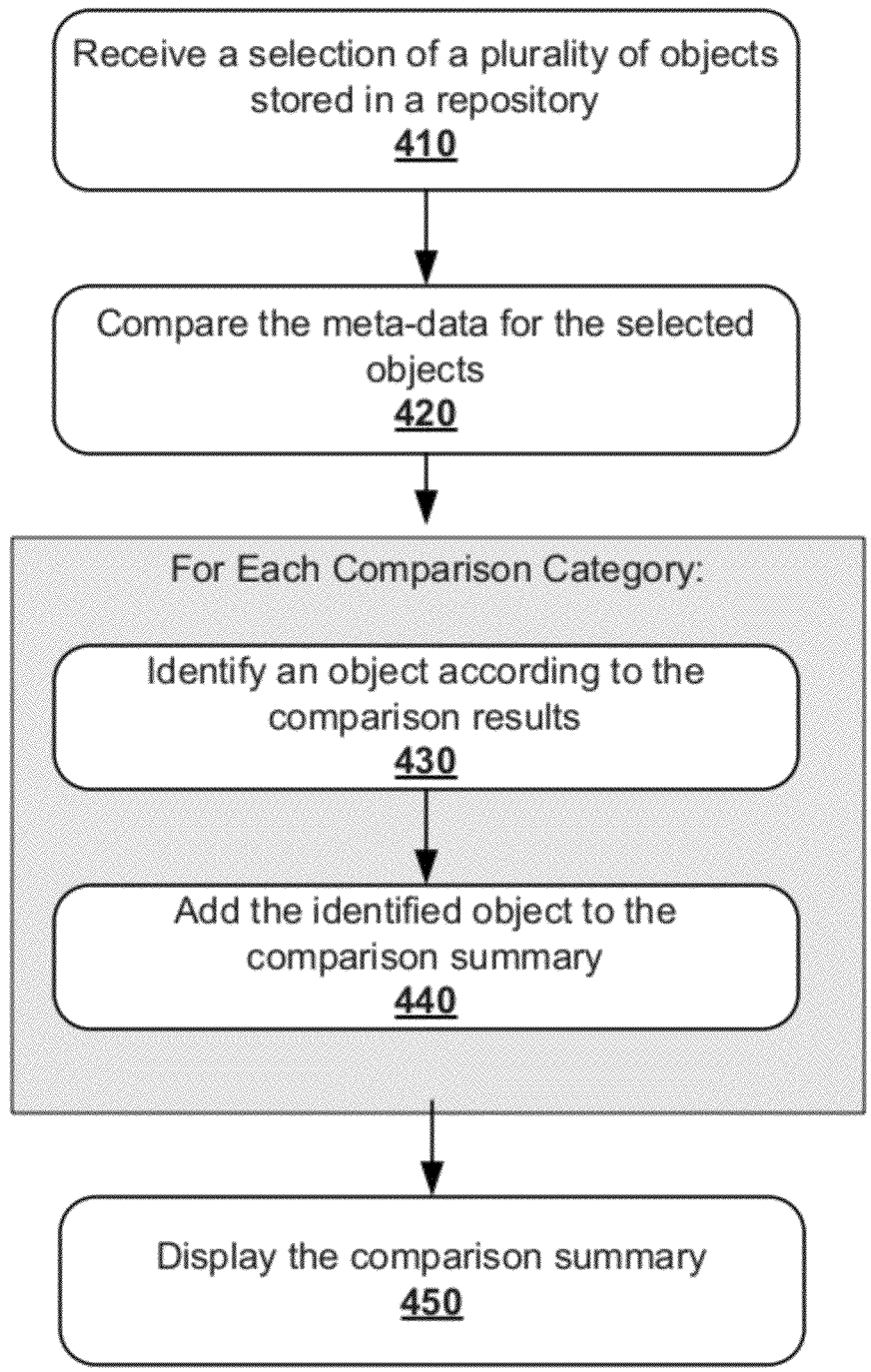
FIG. 4 illustrates an exemplary method for accessing a system according to an embodiment of the present invention.

FIG. 4 illustrates an exemplary method 400 for comparing metadata for a plurality of objects selected from a repository. As shown in FIG. 4, a user having access to a repository storing a plurality of objects may select a subset of the objects for comparison from list of available objects (block 410). Each object may track and store associated metadata comprising information and statistics about the object. As noted previously, the metadata may contain information about the object itself, for example, concerning the size, type, or creation of the object. The metadata may also contain information about the access history for the object including access patterns and user input. For example, the access history may include the number of times the object was accessed or viewed, the objects that were accessed by users subsequent to accessing the object, or user reviews of the object. According to an embodiment of the invention, relevant metadata may include the number of views, the number of positive reviews, the number of negative reviews, and the objects users also viewed for each object. Then, when the user selects a plurality of objects, the metadata associated with each selected object may be collected and compared (block 420).

After a user selects a plurality of objects, a comparison summary of the metadata may be calculated that identifies objects that satisfy certain predetermined comparison categories (block 430). In accordance with an aspect of the invention, the user may specify the comparison categories that may be displayed in the comparison summary. Calculating the comparison summary may include comparing the number of views metadata by comparing the number of views for each object in the selected subset. For example, as shown in Table 1, selected objects stored in the data repository (i.e. Report X, Report Y, and Report Z) may have the specified metadata.

TABLE 1

| Selected Object | Number of Views |
| --- | --- |
| Report X | 50 |
| Report Y | 2 |
| Report Z | 24 |

The report with the highest number of views (i.e. Repot X in Table 1) may be identified for presentation to the user as the object with the most views. If multiple objects have the same number of views, each of the multiple objects may be identified for presentation to the user.

Calculating the comparison summary may additionally include comparing the number of positive reviews metadata by comparing the number of positive reviews or reports for each object in the selected subset. For example, as shown in Table 2, selected objects stored in the data repository (i.e. Report X, Report Y, and Report Z) may have the specified metadata.

TABLE 2

| Selected Object | Number of Thumbs Up |
| --- | --- |
| Report X | 10 |
| Report Y | 2 |
| Report Z | 24 |

The report with the highest number of positive reviews (i.e. Report Z in Table 2) may be identified for presentation to the user as the object with the most positive reviews. If multiple objects have the same number of positive reviews, both objects may be identified for presentation to the user.

Calculating the comparison summary may additionally include comparing the number of negative reviews metadata by comparing the number of negative reviews or reports for each object in the selected subset. For example, as shown in Table 3, selected objects stored in the data repository (i.e. Report X, Report Y, and Report Z) may have the specified metadata.

TABLE 3

| Selected Object | Number of Thumbs Down |
| --- | --- |
| Report A | 10 |
| Report B | 2 |
| Report C | 24 |

The report with the highest number of negative reviews (i.e. Report C in Table 3) may be identified for presentation to the user as the object with the most negative reviews. If multiple objects have the same number of negative reviews, each of the multiple of objects may be identified for presentation to the user.

Calculating the comparison summary may additionally include comparing the other objects users viewed metadata by comparing the objects that were accessed by users subsequent to accessing the object for each object in the selected subset. For example, as shown in Table 4, selected objects stored in the data repository (i.e. Report 1, Report 2, and Report 3) may have the specified metadata.

TABLE 4

| Selected Object | Other Objects Users Viewed |
| --- | --- |
| Report 1 | Report A, Report B, Report C |
| Report 2 | Report Z, Report X, Report A |
| Report 3 | Report A, Report M, Report N |

The objects identified as also being viewed by users who viewed each of the selected objects (i.e. Report A in Table 4) may be identified for presentation to the user as an object also viewed by users that viewed each of the selected objects.

Each of the objects identified according to the comparison categories may then be added to the comparison summary (block 440). The user may select or alter the comparison categories that may be included in the comparison summary. A summary of the object(s) identified for each comparison category may then be displayed such that the relevant objects are singled out or otherwise brought to the user's attention (block 450). For example, the identified object(s) may be listed in a separate window of the user interface, the identified object(s) may be listed in a separate panel of the application window, the identified object(s) may be listed in a balloon or pop-up that may be displayed upon hovering the mouse over an identified or selected object in the object list, an icon representing the comparison category may be placed next to the identified object(s) in the object list, or the identified object(s) may be highlighted in the object list. Icons representing a comparison category may include, for example, a thumbs up representing the highest rated object and a thumbs down for the lowest rated object.

The identified object(s) may be color highlighted in the object list by framing the object in the list with a color, by changing the color of the text of the listed object, or by changing the background color of the listed object. If color is used to highlight the object(s) in the object list, the highlighting may be color coded, for example, green may represent the best rated, red the worst rated, yellow the most viewed or blue the objects also viewed by users that viewed the selected objects.

Not all comparison categories may be identified by icon or color highlight. For example, only those objects that are identified in the most viewed or the highest rated comparison categories may be marked with an icon or color highlighted. In some comparison summaries, an object may be identified for multiple categories. To avoid confusion, the comparison categories may be prioritized. For example, the highest rated object may be the most important and may always be highlighted or marked with an icon. Whereas the objects that were also viewed by the users that viewed the selected objects may be the least significant comparison category and the identified objects may only be highlighted or marked with an icon if no other summary category applies to that object.

Multiple identification methods may be implemented for the object list. For example, an icon representing a relevant summary category may be placed next to the identified object(s) in the original object list and the comparison summary may be simultaneously displayed in a panel of the application window.

Additional metadata may be stored with the objects in the repository and may be compared and displayed in the comparison summary. For example, object metadata may additionally include an 'author', 'author rating' or 'creation time'. Then, a comparison of the 'author rating' for the selected objects may identify an object that has the highest rated author. Similarly, a comparison of the 'creation time' for selected objects may identify the 'most recently' created object.

The foregoing discussion identifies functional blocks that may be used in image display systems constructed according to various embodiments of the present invention. In practice, these systems may be applied in a variety of devices, such as personal computing systems and/or mobile devices. In some applications, the functional blocks described hereinabove may be provided as elements of an integrated software system, in which the blocks may be provided as separate elements of a computer program. In other applications, the functional blocks may be provided as discrete circuit components of a processing system, such as functional units within a digital signal processor or application-specific integrated circuit. Still other applications of the present invention may be embodied as a hybrid system of dedicated hardware and software components. Moreover, not all of the functional blocks described herein need be provided or need be provided as separate units. For example, although FIG. 1 illustrates the components of an exemplary computing system, such as the user interface 111 and the repository 120 as separate units, in one or more embodiments, they may be integrated. Such implementation details are immaterial to the operation of the present invention unless otherwise noted above.

Furthermore, although the above embodiments are described primarily with reference to documents stored in a repository, as will be apparent to one of ordinary skill in the art, aspects of the present invention may have application for varying object types in alternate applications, for example, on e-shopping websites, the user may select a plurality of different products for comparison. By comparing the metadata for the selected products the user can get a quick visual highlight of the product features (i.e. the price, the quality, or other relevant technical features) and quickly identify the highest rated product.

While the invention has been described in detail above with reference to some embodiments, variations within the scope and spirit of the invention will be apparent to those of ordinary skill in the art. Thus, the invention should be considered as limited only by the scope of the appended claims.

I claim:

1. A method for real-time comparison of data objects comprising:
   displaying a first plurality of data objects from a repository in a list;
   receiving a selection from a user of a second plurality of data objects;
   receiving a selection of a comparison category upon which to compare the second plurality of data objects, wherein the comparison category characterizes data objects in the second plurality of data objects based on a portion of metadata associated with the data objects in the second plurality of data objects;

for the selected comparison category, comparing metadata from each of the second plurality of data objects;

for the selected comparison category, generating a comparison summary based upon the comparison of metadata from each of the second plurality of data objects, and displaying the comparison summary for the comparison category in a GUI element associated with the list.

2. The method of claim 1 wherein the metadata further comprises a number of times an object was viewed and the comparison summary identifies an object from the selected data objects that has the most views.

3. The method of claim 1 wherein the metadata further comprises a user review for an object.

4. The method of claim 3 wherein the comparison summary identifies an object from the selected data objects that has the most positive user reviews.

5. The method of claim 3 wherein the comparison summary identifies an object from the selected data objects that has the most negative user reviews.

6. The method of claim 1 wherein the metadata for an object further comprises a subset of data objects that have been viewed by a user that has viewed the object, and the comparison summary identifies an object that is in the subset for each of the selected data objects.

7. The method of claim 1 wherein the comparison summary is displayed by adding an icon in the list next to a data object identified in the comparison summary.

8. The method of claim 1 wherein the comparison summary is displayed by highlighting in the list a data object identified in the comparison summary.

9. The method of claim 8 wherein the highlighting is color coded for a plurality of metadata comparisons.

10. The method of claim 1 wherein the comparison category is selected from the metadata of the second plurality of data objects.

11. The method of claim 1, wherein information on the second plurality of data objects for a plurality of comparison categories are displayed in the comparison summary.

12. The method of claim 11, further comprising prioritizing the plurality of comparison categories displayed in the comparison summary.

13. A system for real-time comparison of data objects comprising:

a memory to store a first plurality of data objects;

a user interface to display a list of the first plurality of data objects, to receive a selection from a user of a second plurality of data objects from the list, and to receive a selection of a comparison category upon which to compare the second plurality of data objects, wherein the comparison category characterizes data objects in the second plurality of data objects based on a portion of metadata associated with the data objects in the second plurality of data objects; and a controller to compare metadata for the selected comparison category from each of the second plurality of data objects and to generate a comparison summary for the selected comparison category based on the comparison of metadata from each of the second plurality of data objects to be displayed by the user interface.

14. The system of claim 13 wherein the metadata further comprises a number of times an object was viewed and the comparison summary identifies an object from the selected data objects that has the most views.

15. The system of claim 13 wherein the metadata further comprises a user review for an object.

16. The system of claim 15 wherein the comparison summary identifies an object from the selected data objects that has the most positive user reviews.

17. The system of claim 15 wherein the comparison summary identifies an object from the selected data objects that has the most negative user reviews.

18. The system of claim 13 wherein the metadata for an object further comprises a subset of data objects that have been viewed by a user that has viewed the object, and the comparison summary identifies an object that is in the subset for each of the selected data objects.

19. The system of claim 13 wherein the user interface displays the comparison summary by adding an icon in the list next to a data object identified in the comparison summary.

20. The system of claim 13 wherein the user interface displays the comparison summary by highlighting in the list a data object identified in the comparison summary.

21. The system of claim 20 wherein the highlighting is color coded for a plurality of metadata comparisons.

22. The system of claim 13 wherein the controller is implemented on a network server.

23. The system of claim 13 wherein the user interface is a browser.

24. The system of claim 13 wherein the comparison category is selected from the metadata of the second plurality of data objects.

* * * * *